United States Patent
Baratange et al.

(10) Patent No.: US 12,204,171 B2
(45) Date of Patent: Jan. 21, 2025

(54) OPTICAL COMPONENT MOUNT AND ASSOCIATED SYSTEM FOR CONTROLLING A LIGHT BEAM

(71) Applicant: AMPLITUDE, Pessac (FR)

(72) Inventors: François Baratange, Gradignan (FR); Benoît Tropheme, Bordeaux (FR)

(73) Assignee: AMPLITUDE, Pessac (FR)

( * ) Notice: Subject to any disclaimer, the term of this patent is extended or adjusted under 35 U.S.C. 154(b) by 572 days.

(21) Appl. No.: 17/612,790

(22) PCT Filed: May 20, 2020

(86) PCT No.: PCT/EP2020/064158
§ 371 (c)(1),
(2) Date: Nov. 19, 2021

(87) PCT Pub. No.: WO2020/234402
PCT Pub. Date: Nov. 26, 2020

(65) Prior Publication Data
US 2022/0244489 A1 Aug. 4, 2022

(30) Foreign Application Priority Data
May 22, 2019 (FR) .................... 19 05378

(51) Int. Cl.
*G02B 7/18* (2021.01)
*G02B 7/00* (2021.01)
*G02B 7/02* (2021.01)

(52) U.S. Cl.
CPC ........... *G02B 7/1815* (2013.01); *G02B 7/008* (2013.01); *G02B 7/028* (2013.01)

(58) Field of Classification Search
CPC .......... G02B 7/00; G02B 7/003; G02B 7/008; G02B 7/028; G02B 7/16; G02B 7/182;
(Continued)

(56) References Cited

U.S. PATENT DOCUMENTS

| 4,657,358 A | 4/1987 | Anthony et al. |
| 4,674,848 A | 6/1987 | Aldrich et al. |

(Continued)

FOREIGN PATENT DOCUMENTS

| DE | 10 2013 215 169 | 2/2015 |
| DE | 102014203144 | 8/2015 |
| WO | 2004/057408 | 7/2004 |

OTHER PUBLICATIONS

International Search Report for PCT/EP2020/064158, mailed Jul. 29, 2020, 5 pages.
(Continued)

*Primary Examiner* — Sultan Chowdhury
(74) *Attorney, Agent, or Firm* — NIXON & VANDERHYE

(57) ABSTRACT

An optical component mount includes a fixed portion and a movable portion, the mount being configured to support at least one optical component, the fixed portion and the movable portion being mechanically connected to each other by a flexible articulation which is capable of allowing the movable portion to move relative to the fixed portion. The mount includes a cooling circuit which is integrated into the fixed portion, the movable portion and the articulation and which is capable of allowing a fluid to flow inside the mount, the cooling circuit including a fluid inlet hole and a fluid outlet hole, the fluid inlet hole and the fluid outlet hole being arranged on the fixed portion.

12 Claims, 4 Drawing Sheets

(58) Field of Classification Search
CPC .... G02B 7/195; G02B 7/1815; G02B 7/1821; G03B 21/14; G03B 21/16; G03B 21/28; G03B 21/145; H04N 9/3141; H04N 9/3144

See application file for complete search history.

(56) References Cited

U.S. PATENT DOCUMENTS

| | | | |
|---|---|---|---|
| 5,535,043 | A | 7/1996 | La Fiandra et al. |
| 8,550,149 | B2 * | 10/2013 | Wang ................. G06F 1/20 417/415 |
| 2007/0091276 | A1 * | 4/2007 | Zakoji ................. G03B 21/16 353/54 |
| 2010/0045940 | A1 * | 2/2010 | Takagi ................. G03B 21/16 353/54 |
| 2010/0243891 | A1 * | 9/2010 | Day ................. G02B 6/4266 372/45.01 |
| 2012/0063116 | A1 * | 3/2012 | Baxter ................. F21V 29/74 362/11 |
| 2018/0023594 | A1 * | 1/2018 | Sheng ................. F04D 1/06 165/104.31 |
| 2019/0154949 | A1 * | 5/2019 | Hosoe ................. G05D 23/1919 |

OTHER PUBLICATIONS

Written Opinion of the ISA for PCT/EP2020/064158, mailed Jul. 29, 2020, 6 pages.

\* cited by examiner

OPTICAL COMPONENT MOUNT AND ASSOCIATED SYSTEM FOR CONTROLLING A LIGHT BEAM

This application is the U.S. national phase of International Application No. PCT/EP2020/064158 filed 20 May 2020, which designated the U.S. and claims priority to FR Patent Application No. 19 05378 filed 22 May 2019, the entire contents of each of which are hereby incorporated by reference.

TECHNICAL FIELD

The present invention generally relates to the field of devices or systems for controlling the intensity, color, phase, polarization and/or direction of high-power and/or high-intensity light beams.

It more particularly relates to the cooling of optical mounts subject to a high-power light beam, for example a laser beam.

STATE OF THE ART

The use of high-power light beams may lead to the warming of different optical and/or mechanical components included in certain optical mounts. This warming may for example come from a phenomenon of absorption of the optical radiation emitted by a laser or a phenomenon of light scattering on another optical or opto-mechanical component of the mount.

The warming caused may then damage one or several components of the optical mount and/or change the alignment of a mount supporting an optical component.

In order to limit these risks of warming, cooling circuits may be attached to fixed mounts. The cooling circuit is in particular composed of pipes and connectors that allow the mount supporting the optical components to be cooled by a flow of a coolant. Documents WO2004/057408, U.S. Pat. Nos. 4,674,848 and 4,657,358 describe for example optical components provided with such cooling circuits.

However, such cooling circuits are not adapted in the case of adjustable, or in other words movable, mounts. Indeed, to limit the transmission of stresses by the pipes to the movable portions, these stresses being liable to cause a misalignment of the mount, it is necessary to use very long pipes. Very long pipes make it difficult to manufacture mounts of small size. Moreover, the presence of connectors and pipes may cause the occurrence of leaks at the pipe connectors in case of bad assembly or degradation with time.

DISCLOSURE OF THE INVENTION

In order to remedy the above-mentioned drawback of the state of the art, the present invention proposes an adjustable opto-mechanical mount including a cooling circuit for homogenizing and controlling the cooling of the opto-mechanical mount but also to provide a cooling as close as possible to an optical component supported by this mount.

More particularly, it is proposed according to the invention an optical component mount comprising a fixed portion and a movable portion, said mount being configured to support at least one optical component, said fixed portion and said movable portion being mechanically connected to each other by a flexible articulation which is adapted to allow the movable portion to move relative to the fixed portion. According to the invention, the mount comprises a cooling circuit which is integrated into the fixed portion, the movable portion and the articulation and which is adapted to allow a fluid to flow inside said mount, said cooling circuit comprising a fluid inlet hole and a fluid outlet hole, said fluid inlet hole and said fluid outlet hole being arranged on said fixed portion.

By flexible articulation, it is meant here a mechanical connection deformable by bending. It is for example a bending blade. On the other hand, the flexible articulation does not correspond here to an actuator capable of longitudinal expansion or contraction.

Therefore, the cooling circuit is directly integrated to the mount. Thus, it does not require the use of connection pipes and connectors internal to the mount, which allows making the mount compact without risk of stresses on the movable portion thereof. The cooling circuit is directly adapted to allow the fluid to flow, whatever the position of the movable portion relative to the fixed portion in the mount.

Other non-limitative and advantageous features of the optical component mount according to the invention, taken individually or according to all the technically possible combinations, are the following:
  the fixed portion, the movable portion and the articulation are made in one piece,
  said articulation allows a rotational motion of the movable portion relative to the fixed portion about an axis of rotation or a translational motion of the movable portion relative to the fixed portion along an axis of translation,
  the movable portion comprises an optical component support portion,
  it is also provided another movable portion mechanically connected to said movable portion by another articulation adapted to allow another motion of said other movable portion relative to said movable portion, the cooling circuit being integrated into the other movable portion and the other articulation,
  the other articulation allows another rotational motion of the other movable portion about another axis of rotation or another translational motion of the other movable portion relative to the movable portion along another axis of translation,
  said other axis of rotation is orthogonal to said axis of rotation associated with the rotational motion of said movable portion,
  said other movable portion comprises another optical component support portion,
  the fixed portion and the movable portion comprise a metal material, and
  the fluid flowing inside the cooling circuit comprises water, propylene glycol and/or a gas.

The invention also proposes a system for controlling a light beam in intensity, wavelength, phase, polarization and/or direction, the system comprising an optical component mount as described according to any one of the embodiments.

The following description in relation with the appended drawings, given by way of non-limitative examples, will allow a good understanding of what the invention consists of and of how it can be implemented.

BRIEF DESCRIPTION OF THE DRAWINGS

In the appended drawings.

DETAILED DESCRIPTION

The present invention relates to an optical component mount 1, 100, 200, 300 (also called mount 1, 100, 200, 300 hereinafter), used for example in a system for controlling a light beam (not shown) in intensity, wavelength, phase, polarization and/or direction. The system comprises for example a laser source and a plurality of optical components allowing the implementation of one or several desired features of the system. For that purpose, each optical component is mounted on an opto-mechanical mount in order, in particular, to allow an accurate arrangement and alignment of each optical component. As a variant, the optical component mount 1, 100, 200, 300 may be integrated into any type of system using a light beam, for example for applications within the framework of optical frequency conversion, beamforming, beam transport, control of intensity, phase, polarization and/or modulation.

According to the invention, the mount 1, 100, 200, 300 is configured to support at least one optical component. The optical component is for example an optical lens or an optical mirror for light beam transport or light beam direction, focusing or forming control applications. The mount according to the invention can also be used in such a way as to approach the cooling as close as possible to an optical component such as an optical amplifier (for example, neodymium-doped yttrium aluminum garnet (Nd:YAG), ytterbium-doped yttrium aluminum garnet (Yb:YAG), neodymium-doped yttrium vanadate (NdYVO$_4$)) in the case of optical generation and amplification, or a non-linear optical component (for example, crystal of lithium triborate (LiB$_3$O$_5$ or LBO), barium beta-borate (BBO), RTP, KTP) in the case of optical frequency conversion, or an electro-optical component (for example, barium beta-borate (BBO), potassium titanyl phosphate (KTiOPO$_4$) or KTP) or also an acousto-optical component (for example, quartz crystal).

Figure 1:
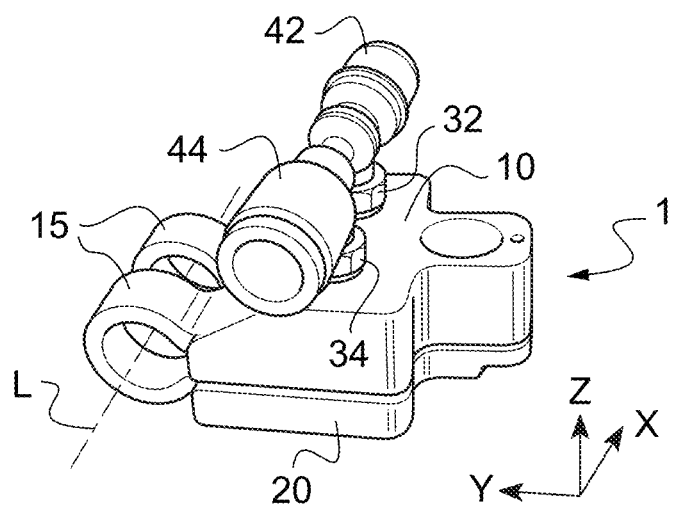
FIG. 1 is a perspective view of a first example of an optical component mount according to the invention.

FIG. 1 is a perspective view of a first exemplary embodiment of the optical component mount 1.

Mount 1 comprises a fixed portion 10 and a movable portion 20. By movable portion, it is herein meant a portion capable of rotational or translational motion. This movable portion does not correspond to a deformable portion, for example deformable in longitudinal extension or contraction.

As can be seen in FIG. 1, fixed portion 10 and movable portion 20 are mechanically connected to each other by an articulation 15. This articulation 15 is flexible. Articulation 15 is configured to allow movable portion 20 to move relative to fixed portion 10. Here, articulation 15 has the form of two loops not closed on themselves, corresponding to a bending plate. The loops are here in the form of toroidal portions about an L-axis parallel to X-axis in an XYZ orthonormal reference frame. The loops have a rectangular cross-section in a plane comprising L-axis, with a height along X-axis higher than their width, taken radially with respect to X-axis. One end of each loop is connected to fixed portion 10 and the other end of each loop is connected to movable portion 20. When a mechanical stress is applied between fixed portion 10 and movable portion 20, the loops 15 undergo a bending or rotational deformation about the L-axis. About the transverse Y and/or Z directions, the loops have a higher rigidity and have no or little torsional deformation. Consequently, movable portion 20 is guided for a rotational motion about L-axis.

Articulation 15 allows a rotational motion of movable portion 20 about an axis of rotation L (visible in FIG. 1). In practice, movable portion 20 is set in motion and thus performs a rotational motion about the axis of rotation L, for example by adjustment of an adjustment screw between fixed portion 10 and movable portion 20. Here, articulation 15 is flexible in rotation about the L-axis.

Articulation 15 is thus configured to move movable portion 20 away from or closer to fixed portion 10 according to a rotational motion about the axis of rotation L. In other words, articulation 15 allows a motion that tilts movable portion 20 relative to fixed portion 10. Mount 1 is hence made adjustable by the presence of articulation 15.

Movable portion 20 comprises a fastening means (not shown in FIG. 1) for fastening the optical component to mount 1. In the example of FIG. 1, the optical component intended to be fastened to movable portion 20 is preferably a mirror. For example, the optical component is adhesively fastened to the planar external face of movable portion 20. This planar face of movable portion 20 corresponds to the surface of thermal exchanges with the optical component.

Mount 1 further comprises a cooling circuit (not visible in FIG. 1). The cooling circuit is integrated into mount 1. In other words, the cooling circuit is integrated into fixed portion 10, movable portion 20 and articulation 15.

The cooling circuit is adapted to cool mount 1 in order, in particular, to avoid a warming of the latter and/or of the optical component it supports. For that purpose, the cooling circuit allows a fluid to flow inside mount 1. This fluid is a coolant, for example water, propylene and/or glycol or a gas such as air or helium.

In order to allow the fluid to flow inside mount 1, the cooling circuit comprises a fluid inlet hole 32 and a fluid outlet hole 34. Fluid inlet hole 32 allows the introduction of fluid inside the cooling circuit, thus inside mount 1. Fluid outlet hole 34 allows extraction of the fluid from the cooling circuit, thus from mount 1.

Fluid inlet hole 32 and fluid outlet hole 34 are arranged on the fixed portion of mount 1. As can be seen in FIG. 1, connectors 42, respectively 44, are arranged at the fluid inlet hole 32 and, respectively, fluid outlet hole 34. These connectors 42, 44 allow for example the cooling circuit of mount 1 to be connected to pipes for fluid supply and extraction.

According to the invention, fixed portion 10, movable portion 20 and articulation 15 are made in one piece. In other words, mount 1 is made in one block. In particular, the cooling circuit is made integral with all the elements of mount 1, that is to say integral with fixed portion 10, movable portion 20, intended to form the optical component support, and articulation 15.

Thus, the fluid is injected into the cooling circuit via fluid inlet hole 32. The fluid propagates within the cooling circuit and passes successively through fixed portion 10, a loop of flexible articulation 15, movable portion 20, the other loop of flexible articulation 15 and fixed portion 10 towards fluid outlet hole 34. The fluid is extracted from the cooling circuit via fluid outlet hole 34. The fluid flows through the cooling circuit with a controlled flow rate.

By heat conduction between the cooling circuit, the support portion and the optical component, a homogeneous cooling of mount 1 is observed, making it possible to maintain it at a fixed temperature in order to avoid a misalignment of mount 1. Indirectly, this also allows an efficient cooling of the optical component.

Mount 1 is made from a metal material. In particular, fixed portion 10, movable portion 20 and articulation 15 comprise a metal material. The metal material comprises for example aluminum, copper, titanium or stainless steel.

In practice, mount 1 is made by additive manufacturing. For example, additive manufacturing technologies such as selective laser melting or molten powder metal jet are used here.

Advantageously, making mount 1 by additive manufacturing makes it possible to produce mount 1 directly at the desired shape while integrating the cooling circuit. In practice, during the additive manufacturing, the metal powder used is not molten at any point of the mount. This local partial melt makes it possible to define the cooling circuit. The powder is then evacuated after the manufacturing by blown compressed air in order to create the empty space corresponding to the cooling circuit.

Therefore, as the cooling circuit is integrated to mount 1, it is directly adapted to allow the fluid flow whatever the position of movable portion 20 relative to fixed portion 10. The cooling circuit thus does not need the introduction of pipes in mount 1 to allow the fluid flow. The opto-mechanical mount is thus more compact. Moreover, as the connection pipes are connected only to the fixed portion of the mount, this allows avoiding stresses to be applied to movable portion 20 of mount 1, and hence avoiding a misalignment of mount 1.

The one-block making of mount 1 including the cooling circuit further allows increasing the compactness thereof. As mount 1 is directly made in one piece with the desired features, this also allows reducing the manufacturing, assembly and storage costs.

Figure 2:
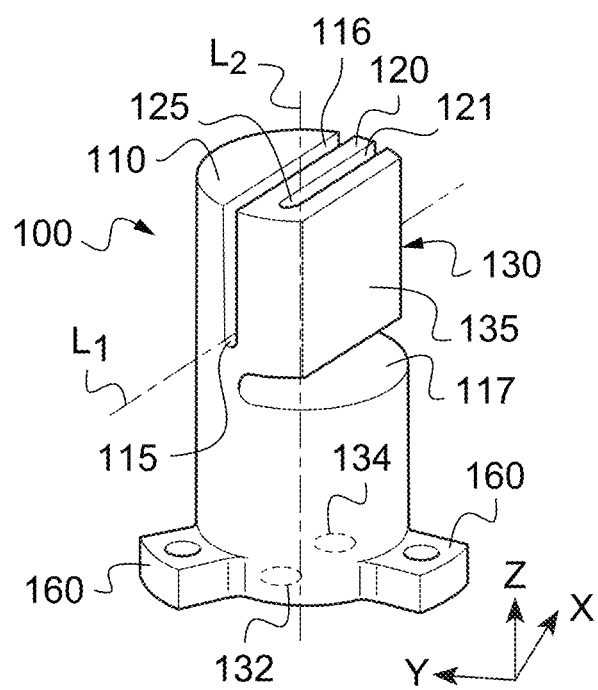
FIG. 2 is a perspective view of a second example of an optical component mount according to the invention.
Figure 3:
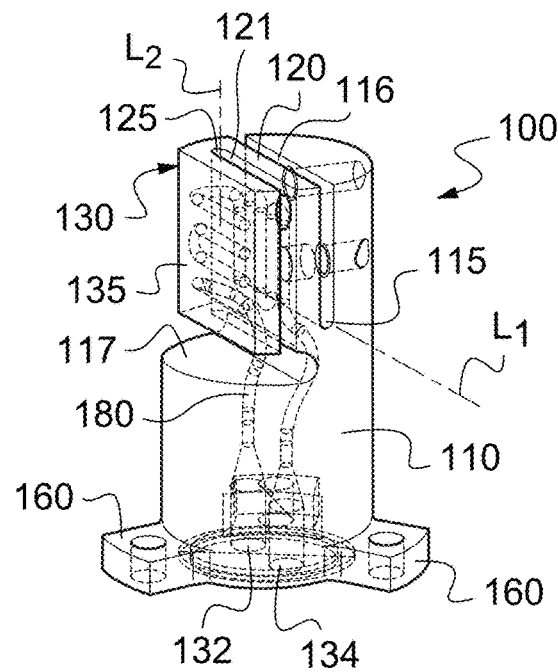
FIG. 3 is another perspective view, in transparency, of the second example of the optical component mount according to the invention.

FIGS. 2 and 3 are perspective views of a second exemplary embodiment of the optical component mount 100. FIG. 3 is a perspective view, in transparency, of mount 100, schematically showing the inside of mount 100.

Mount 100 comprises fixed portion 110 and movable portion 120. As can be seen in FIGS. 2 and 3, fixed portion 110 and movable portion 120 are mechanically connected to each other by articulation 115. Fixed portion 110 comprises at least one assembly means 160 for fastening mount 100 to a support (not shown here). For example, all the elements of the light beam control system are fastened to this support. Fixed portion 110 here comprises three assembly means 160. For example, here, the assembly means comprises a fastening tab provided with an opening for the insertion of a screw.

Just like in the first exemplary embodiment of the above-described mount 1, articulation 115 is flexible. Articulation 115 is configured to allow the angular orientation of movable portion 120 relative to fixed portion 110. Here, articulation 115 forms a bending blade. More precisely, articulation 115 is here formed by a solid portion delimited by two recesses 116, 117 between fixed portion 110 and movable portion 120. Recess 116 is formed in an XZ plane between fixed portion 110 and movable portion 120. Recess 117 is formed in an XY plane between fixed portion 110 and movable portion 120. The solid portion between fixed portion 110 and movable portion 120 extends along X-axis. When a mechanical stress is applied between fixed portion 110 and movable portion 120, articulation 115 is deformed by bending about $L_1$-axis parallel to X-axis. About the transverse Y and/or Z directions, articulation 115 has a higher rigidity and has no or little torsional deformation. Consequently, movable portion 120 is guided for a rotational motion about $L_1$-axis.

Articulation 115 allows a rotational motion of movable portion 120 about an axis of rotation $L_1$ (visible in FIGS. 2 and 3). In practice, movable portion 120 is set in motion by application of an actuator between movable portion 120 and fixed portion 110, for example a manual or motorized adjustment screw, preferably of fine pitch, for example a micrometric screw. Here, articulation 115 is flexible. Mount 100 is hence made adjustable by the presence of articulation 115. In practice, adjustment screws (not shown in FIGS. 2 and 3) can be used to exert an effort on articulation 115 and thus change an angle between movable portion 120 and fixed portion 110.

As shown in FIGS. 2 and 3, mount 100 further comprises another movable portion 130. This other movable portion 130 is mechanically connected to movable portion 120 by another articulation 125. This other articulation 125 is flexible. Other articulation 125 is configured to allow the angular orientation of other movable portion 130 relative to movable portion 120. Here, other articulation 125 is a bending blade. More precisely, other articulation 125 is here formed by a solid portion delimited by a recess 121 between movable portion 120 and other movable portion 130. Recess 121 is formed in an XZ plane between movable portion 120 and other movable portion 130. The solid portion between movable portion 120 and other movable portion 130 extends along Z-axis. When a mechanical stress is applied between movable portion 120 and other movable portion 130, other articulation 125 is deformed by bending about $L_2$-axis parallel to Z-axis. About the transverse X and/or Y directions, other articulation 125 has a higher rigidity and have no or little torsional deformation. Consequently, other movable portion 130 is guided for a rotational motion about $L_2$-axis.

Other articulation 125 allows a rotational motion of other movable portion 130 about another axis of rotation $L_2$ shown in FIGS. 2 and 3. Preferably, the axis of rotation $L_1$ and the other axis of rotation $L_2$ are orthogonal to each other. In practice, like for the angular orientation of movable portion 120, other movable portion 130 is set in motion by application of an actuator between other movable portion 130 and movable portion 120, for example a manual or motorized adjustment screw. Other articulation 125 is also flexible. In practice, adjustment screws (not shown in FIGS. 2 and 3) can be used to exert an effort on other articulation 125 and hence to set other movable portion 130 in motion.

Thus, thanks to articulation 115 and other articulation 125, mount 100 supporting the optical component is adjustable according to two rotational degrees of freedom about the axis of rotation $L_1$ and the other axis of rotation $L_2$.

Other movable portion 120 comprises another fastening means (not shown in FIGS. 2 and 3) for fastening the optical component to mount 100. In the example of FIGS. 2 and 3, the optical component is a mirror, for example adhesively fastened to the planar face 135 of other movable portion 130.

Like in the first exemplary embodiment described hereinabove, mount 100 further comprises a cooling circuit 180. This cooling circuit 180 is shown in dotted line in FIG. 3. The cooling circuit 180 is integrated into mount 100. In other words, and as can be seen in FIG. 3, cooling circuit 180 is integrated into fixed portion 110, movable portion 120, articulation 115, other movable portion 130, which serves as a support for the optical component, and other articulation 125.

Cooling circuit 180 is adapted to cool mount 100 in order, in particular, to avoid a warming of the latter and/or more particularly of the optical component it supports. For that purpose, cooling circuit 180 allows a fluid to flow inside mount 100 up to other movable portion 130 whose planar face 135 supports the optical component. This fluid is a coolant, for example water. The planar face 135 of other movable portion 130 corresponds to the surface of thermal exchanges with the optical component.

In order to allow the fluid flow inside mount 100, cooling circuit 180 comprises a fluid inlet hole 132 and a fluid outlet hole 134. Fluid inlet hole 132 allows the introduction of fluid inside cooling circuit 180, and thus inside mount 100. Fluid outlet hole 134 allows extraction of the fluid from cooling circuit 180, and thus from mount 100.

Fluid inlet hole 132 and fluid outlet hole 134 are arranged to fixed portion 110 of mount 100.

Thus, the fluid is injected into cooling circuit 180 via fluid inlet hole 132. The fluid propagates within cooling circuit 180 and passes successively through fixed portion 110, articulation 115, movable portion 120, other articulation 125, other movable portion 130, then again through other articulation 125, movable portion 120, articulation 115 and fixed portion 110 towards outlet hole 134. The fluid is extracted from the cooling circuit via outlet hole 134. The fluid flows through the cooling circuit with a controlled flow rate. Of course, the fluid flow direction may be reversed.

According to the present disclosure, fixed portion 110, movable portion 120, articulation 115, other movable portion 130 and other articulation 125 are made in one piece. In other words, mount 100 is made in one block. In particular, cooling circuit 180 is made integral with all the elements of mount 100, that is to say integral with fixed portion 110, movable portion 120, articulation 115, other movable portion 130 and other articulation 125.

Mount 100 is made from a metal material. In particular, fixed portion 110, movable portion 120, articulation 115, other movable portion 130 and other articulation 125 comprise a metal material. The metal material comprises for example aluminum, copper or stainless steel.

In practice, as described in the case of the first exemplary embodiment, mount 100 is made by additive manufacturing.

Figure 4:
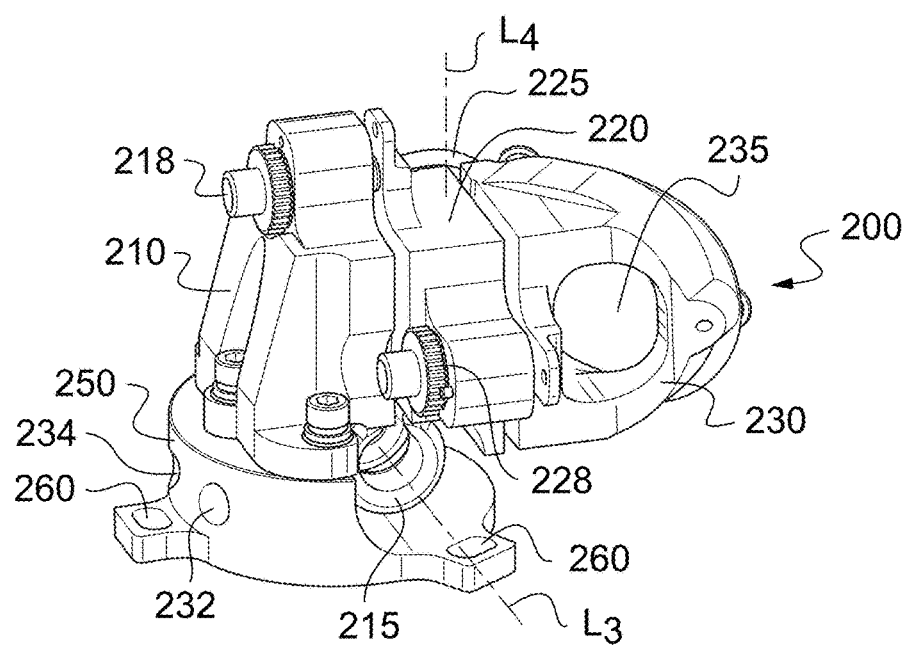
FIG. 4 is a perspective view of a third example of an optical component mount according to the invention.
Figure 5:
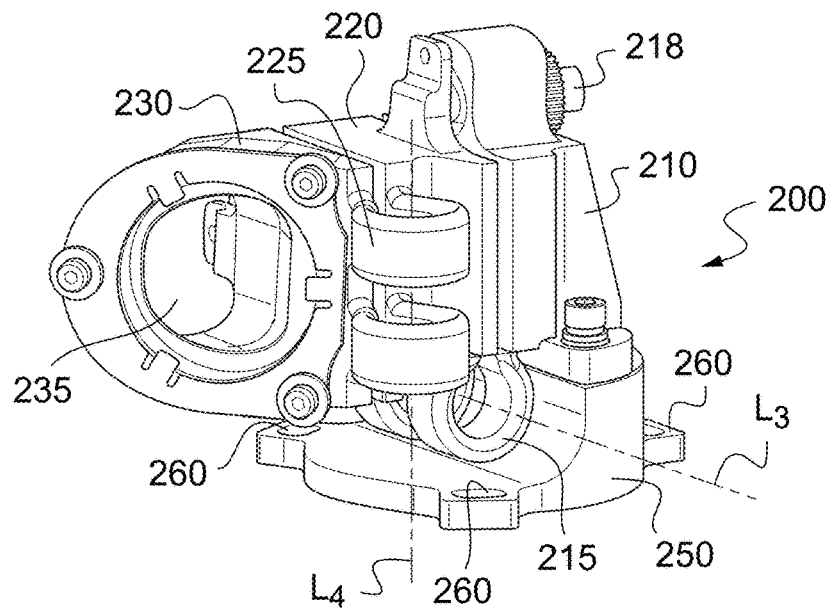
FIG. 5 is another perspective view of the third example of the optical component mount according to the invention.
Figure 6:
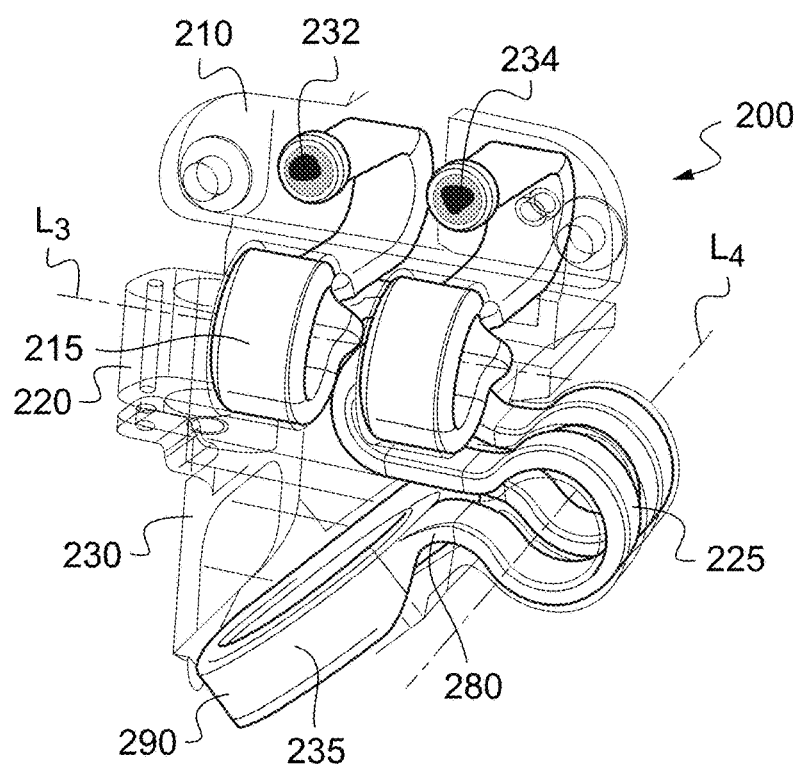
FIG. 6 is another perspective view, in transparency, of the third example of the optical component mount according to the invention.

FIGS. 4 to 6 are perspective views of a third exemplary embodiment of the optical component mount 200. FIG. 4 shows a first perspective view of mount 200. FIG. 5 shows a second perspective view of mount 200. FIG. 6 is a perspective view, in transparency, of mount 200, schematically showing the cooling circuit inside mount 200.

Mount 200 comprises fixed portion 210 and movable portion 220. As can be seen in FIGS. 4 and 5, fixed portion 210 and movable portion 220 are mechanically connected to each other by articulation 215.

Fixed portion 210 is fastened to a base 250 comprising at least one assembly means 260 for fastening mount 200 to a support (not shown here). Base 250 here comprises three assembly means 260. For example, here, assembly means 260 comprises, for example, tabs provided with an opening for the insertion of a fastening screw.

Just like in the first and second exemplary embodiments of mount 1, 100 described hereinabove, articulation 215 is flexible. Articulation 215 is configured to allow movable portion 220 to move relative to fixed portion 210. Here, articulation 215 comprises two loops corresponding to a bending blade, similarly to articulation 15 described in connection with FIG. 1.

Articulation 215 allows a rotational motion of movable portion 220 about an axis of rotation $L_3$ (visible in FIGS. 4 to 6). In practice, movable portion 220 is angularly oriented by application, for example, of an actuator between movable portion 220 and fixed portion 210, for example a manual or motorized adjustment screw. Here, articulation 215 is flexible. Here, an adjustment screw 218 is used to exert an effort on articulation 215 and hence to angularly orient movable portion 220. A return system formed by articulation 215 itself is used to hold adjustment screw 218 in place. Mount 200 is hence made adjustable by the presence of articulation 215.

As shown in FIGS. 4 and 5, mount 200 further comprises another movable portion 230. This other movable portion 230 is mechanically connected to movable portion 220 by another articulation 225. This other articulation 225 is flexible. Other articulation 225 is configured to allow other movable portion 230 to move relative to movable portion 220. Here, other articulation 255 comprises two loops corresponding to a bending blade.

Other articulation 225 allows a rotational motion of other movable portion 230 about another axis of rotation $L_4$ shown in FIGS. 4 and 6. The rotational motion of each articulation 215, 225 has here a maximum amplitude of the order of 3 degrees. Preferably, the axis of rotation $L_3$ and the other axis of rotation $L_4$ are orthogonal to each other. In practice, like for the angular orientation of movable portion 220, other movable portion 230 is angularly oriented by application of an actuator between other movable portion 230 and movable portion 220, for example a manual or motorized adjustment screw. Other articulation 225 is also flexible. Here, another adjustment screw 228 is used to exert an effort on other articulation 225 and hence to angularly orient other movable portion 230. Another return system consisted of other articulation 225 is used to hold other adjustment screw 228 in place.

Thus, thanks to articulation 215 and other articulation 225, mount 200 supporting the optical component is adjustable according to two rotational degrees of freedom about the axis of rotation $L_3$ and the other axis of rotation $L_4$.

Other movable portion 230 comprises an optical component support portion here comprising an opening 235. The support portion is adapted to fasten the optical component to mount 200. In the example of FIGS. 4 to 6, the optical component comprises an optical lens that is arranged or fastened in the support portion comprising opening 235 in order to be held in mount 200. In this case, the surface of thermal exchanges is ring-shaped or cylindrical with a circular cross-section. As an alternative, the optical component comprises an optical system with lenses. Advantageously, opening 235 comprises a through-hole for the passage of a light beam by transmission through the optical component held on movable portion 230 of the mount.

Like in the first and second exemplary embodiments described hereinabove, mount 200 further comprises a cooling circuit 280. This cooling circuit 280 is shown in FIG. 6. The cooling circuit 280 is integrated into mount 200. In other words, and as can be seen in FIG. 6, cooling circuit 280 is integrated into fixed portion 210, movable portion 220, articulation 215, other movable portion 230, comprising the optical component support portion, and other articulation 225.

Cooling circuit 280 is adapted to cool mount 200 in order, in particular, to avoid a warming of the latter and of the optical component it supports. For that purpose, cooling circuit 280 allows a fluid 290 to flow inside mount 200 up to the optical component support portion. This fluid 290 is a coolant, for example water.

In practice, the cooling circuit has a total length of the order of 400 millimeters (mm). The cross-section of the cooling circuit about the optical component is oblong in shape with a size of the order of 6 mm×2 mm or 5 mm×2.5 mm.

In order to allow fluid 290 to flow inside mount 200, cooling circuit 280 comprises a fluid inlet hole 232 and a fluid outlet hole 234. Fluid inlet hole 232 allows the introduction of fluid 290 inside cooling circuit 280 (thus inside mount 200). Fluid outlet hole 234 allows extraction of the fluid from cooling circuit 280, thus from mount 200.

Fluid inlet hole 232 and fluid outlet hole 234 are arranged on fixed portion 110 of mount 200. Thus, the fluid is injected into cooling circuit 280 via fluid inlet hole 232. The fluid propagates within cooling circuit 280 and passes successively through fixed portion 210, a loop of articulation 215, movable portion 220, a loop of other articulation 225, other movable portion 230, then through another loop of other articulation 225, movable portion 220, another loop of articulation 215 and fixed portion 210 towards outlet hole 234. The fluid is extracted from the cooling circuit via outlet hole 134. The fluid flows through the cooling circuit with a controlled flow rate. The flow rate of fluid 290 in cooling circuit 280 is in practice limited by the internal circuit. The water flow rate is here, for example, of the order of 1 L/min. Of course, the fluid flow direction may be reversed.

According to the present disclosure, fixed portion 210, movable portion 220, articulation 215, other movable portion 230 and other articulation 225 are made in one piece. In other words, this means that mount 200 is made in one block. In particular, cooling circuit 280 is made integral with all the elements of mount 200, that is to say integral with fixed portion 210, movable portion 220, articulation 215, other movable portion 230, serving as an optical component support, and other articulation 225. Including cooling circuit 280 inside mount 200 thus allows the efficient cooling of the optical component through the optical component support portion inside which passes cooling circuit 280.

Mount 200 is made from a metal material. In particular, fixed portion 210, movable portion 220, articulation 215, other movable portion 230 and other articulation 225 comprise a metal material. The metal material comprises for example aluminum, titanium, copper or stainless steel.

In practice, as described in the case of first and second exemplary embodiments, mount 200 is made by additive manufacturing.

Figure 7:
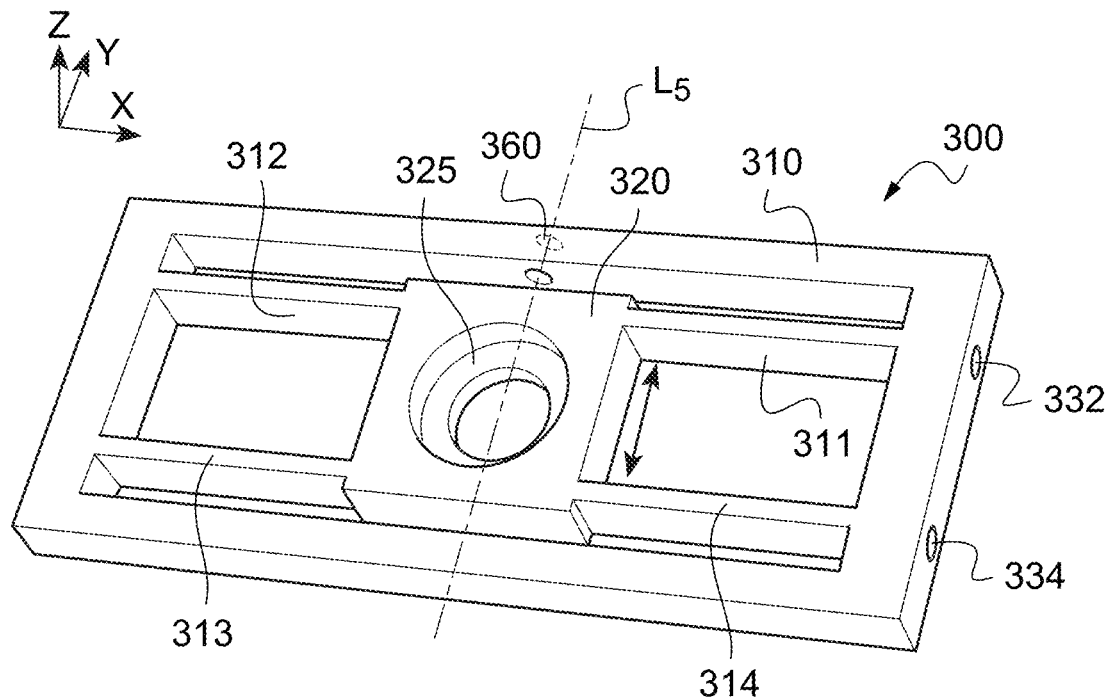
FIG. 7 is a perspective view of a fourth example of an optical component mount according to the invention.
Figure 8:
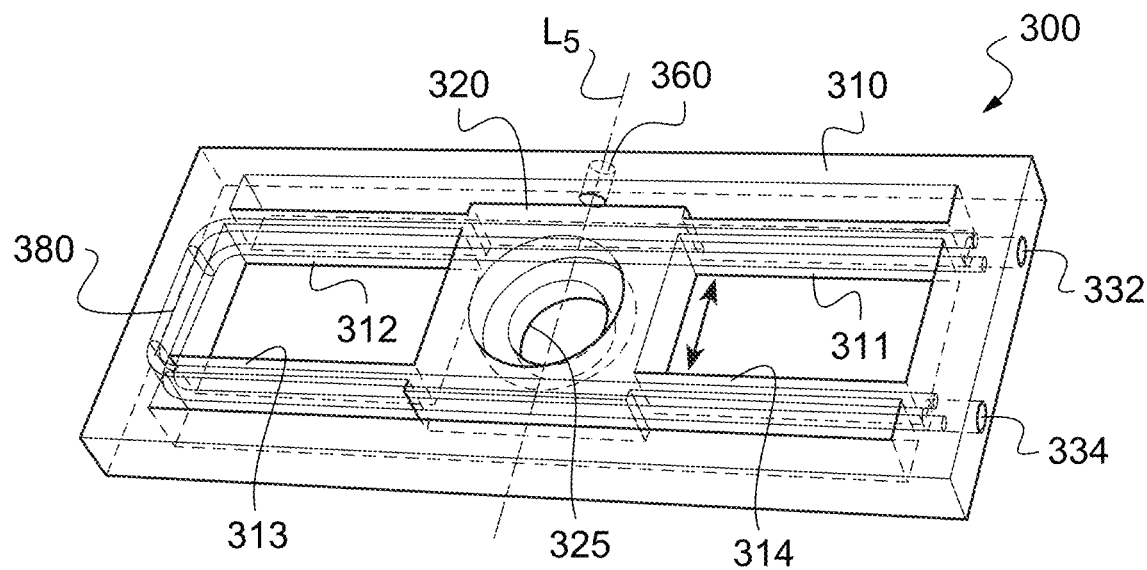
FIG. 8 is another perspective view, in transparency, of the fourth example of the optical component mount according to the invention.

FIGS. 7 and 8 are perspective views of a fourth exemplary embodiment of the optical component mount 300. FIG. 8 is a perspective view, in transparency, of mount 300, schematically showing the inside of mount 300.

Mount 300 comprises fixed portion 310 and movable portion 320. As can be seen in FIGS. 7 and 8, fixed portion 310 and movable portion 320 are mechanically connected to each other by a flexible articulation. Here, mount 300 comprises four legs 311, 312, 313, 314 forming the flexible articulation. Each of the legs 311, 312, 313, 314 of the articulation is connected to movable portion 320 and to fixed portion 310. The four legs 311, 312, 313, 314 have an elongated shape along X-direction in an XYZ orthonormal reference frame. In the illustrated example, legs 311, 312, 313, 314 have a rectangular cross-section, narrower in Y-direction than in Z-direction.

Just like in the exemplary embodiments of mount described hereinabove, the articulation is flexible. Unlike in the embodiments described in connection with FIGS. 1 to 6, the articulation is configured to allow the translation motion of movable portion 320 relative to fixed portion 310. Here, each leg 311, 312, 313, 314 of the articulation forms a bending blade. One end of each leg 311, 312, 313, 314 is connected to the fixed portion and the other end of each leg is connected to movable portion 320. When a stress is applied to movable portion 320, the legs 311, 312, 313, 314 are deformed by bending about Y-axis. In the other X and/or Y directions, the legs have a higher rigidity and have no or little deformation. Consequently, movable portion 320 is guided for a translational motion along Y-axis. Advantageously, thanks to the invention, the use of the four legs 311, 312, 313, 314 allows obtaining a pure translational motion.

As an alternative, the flexible articulation comprises two bending blades, for example legs 311, 314. The use of these two legs then allows a translational motion along Y-axis and a residual motion along X-axis.

The flexible articulation here allows a translational motion of movable portion 320 along an axis of translation $L_5$ (visible in FIGS. 7 and 8) parallel to Y-axis. In practice, movable portion 320 is set in motion by application of an actuator between movable portion 320 and fixed portion 310, for example a manual or motorized adjustment screw, preferably of fine pitch, or a micrometric screw. By way of non-limitative example, hole 360 comprises a thread, an adjustment screw is screwed into hole 360 and comes into rest against a planar face of movable portion 320. Here, the articulation is flexible. Mount 300 is hence made adjustable in translation by the presence of the articulation. In practice, adjustment screws (not shown in FIGS. 7 and 8) can be used to exert an effort on the articulation and thus change the position of movable portion 320 relative to fixed portion 310 (in translation).

Movable portion 320 is herein intended to form the optical component support. For that purpose, movable portion 320 comprises an opening 325 with a stepped bore. Opening 325 is adapted to receive an optical component such as a mirror, a lens or other. Advantageously, opening 325 comprises a through-hole for the passage of a light beam by transmission through the optical component held on movable portion 230 of the mount.

Like in the above-described exemplary embodiments, mount 300 further comprises a cooling circuit 380. This cooling circuit 380 is shown in dotted line in FIG. 8. The cooling circuit 380 is integrated into mount 300. In other words, and as can be seen in FIG. 8, cooling circuit 380 is integrated into fixed portion 310, movable portion 320 and each leg 311, 312, 313, 314 of the articulation.

Cooling circuit 380 is adapted to cool mount 300 in order, in particular, to avoid a warming of the latter and, more particularly, of the optical component it supports. For that purpose, cooling circuit 380 allows a fluid to flow inside mount 300. This fluid is a coolant, for example water.

In order to allow the fluid flow inside the mount 300, cooling circuit 380 comprises a fluid inlet hole 332 and a fluid outlet hole 334. Fluid inlet hole 332 allows the introduction of fluid inside cooling circuit 380, and hence inside mount 300. Fluid outlet hole 334 allows extraction of the fluid from cooling circuit 380, and thus from mount 300.

Fluid inlet hole 332 and fluid outlet hole 334 are arranged on fixed portion 310 of mount 300. The fluid is injected into cooling circuit 380 via fluid inlet hole 332. The fluid propagates within cooling circuit 380 and passes successively through fixed portion 310, first leg 311 of the articulation, movable portion 320, second leg 312 of the articulation, fixed portion 310, third leg 313 of the articulation, movable portion 320, fourth leg 314 of the articulation and fixed portion 310 towards outlet hole 334. The fluid is extracted from the cooling circuit via outlet hole 334. The fluid flows through the cooling circuit with a controlled flow rate. Of course, the fluid flow direction may be reversed.

According to the invention, fixed portion 310, movable portion 320 and all the legs 311, 312, 313, 314 of the articulation are made of one piece. In other words, mount 300 is made of one block. In particular, cooling circuit 380 is made integral with all the elements of mount 300, that is to say integral with fixed portion 310, movable portion 320 and each articulation 315.

Mount 300 is made from a metal material. In particular, fixed portion 310, movable portion 320 and each articulation 315 comprise a metal material. The metal material comprises for example aluminum, copper or stainless steel.

In practice, as described in the case of the previous exemplary embodiments, mount 300 is made by additive manufacturing.

Mount 300 illustrated in FIGS. 7 and 8 is flexible in translation along an axis of translation $L_5$. The person skilled in the art will easily adapt mount 300 using another articulation connecting movable portion 320 to another movable portion. In an exemplary embodiment, this other articulation is also a flexible articulation allowing another translational motion along another axis of translation between movable portion 320 and the other movable portion. Advantageously, the other axis of translation is transverse to the axis of translation $L_5$. Hence, a mount adjustable along two translational degrees of freedom is obtained.

The person skilled in the art will easily adapt the exemplary adjustable mounts described hereinabove to combine them between each other. For example, it is possible to combine a system with 3 rotational degrees of freedom and 3 translational degrees of freedom. The application of the invention will consist in making the cooling circuit pass through each of the six flexible articulations.

A mount can hence be made comprising an articulation flexible in rotation, another articulation flexible in translation, both flexible articulations being arranged in series, and the cooling circuit being integrated to the mount. The cooling circuit passes in series via fluid inlet hole 332 inside the fixed portion of the mount, the first articulation, the second articulation, the movable portion of the mount, then passes again through the second articulation, the first articulation then the fixed portion of the mount towards the fluid outlet hole.

A mount integrating a cooling circuit and comprising 1 to 6 flexible articulations having 1 to 3 rotational degrees of freedom and/or 1 to 3 translational degrees of freedom can hence be obtained.

The invention claimed is:

1. An optical component mount comprising a fixed portion and a movable portion, said optical component mount being configured to support at least one optical component, said fixed portion and said movable portion being mechanically connected to each other by a flexible articulation which is adapted to allow the movable portion to move relative to the fixed portion, wherein the optical component mount comprises a cooling circuit which is integrated into the fixed portion, the movable portion and the articulation and which is adapted to allow a fluid to flow inside said optical component mount, said cooling circuit comprising a fluid inlet hole and a fluid outlet hole, said fluid inlet hole and said fluid outlet hole being arranged on said fixed portion, and
wherein the optical component mount comprises another movable portion mechanically connected to said movable portion by another articulation configured to allow another motion of said another movable portion relative to said movable portion, the cooling circuit being integrated into the another movable portion and the another articulation.

2. The optical component mount according to claim 1, wherein the fixed portion, the movable portion and the articulation are made of one piece.

3. The optical component mount according to claim 2, wherein said articulation allows a rotational motion of the movable portion relative to the fixed portion about an axis of rotation or a translational motion of the movable portion relative to the fixed portion along an axis of translation.

4. The optical component mount according to claim 2, wherein the another articulation allows another rotational motion of the another movable portion about another axis of rotation or another translational motion of the another movable portion relative to the movable portion along another axis of translation.

5. The optical component mount according to claim 1, wherein said articulation allows a rotational motion of the movable portion relative to the fixed portion about an axis of rotation or a translational motion of the movable portion relative to the fixed portion along an axis of translation.

6. The optical component mount according to claim 5, wherein the another articulation allows another rotational motion of the another movable portion about another axis of rotation or another translational motion of the another movable portion relative to the movable portion along another axis of translation.

7. The optical component mount according to claim 5, wherein said another movable portion comprises another optical component support portion.

8. The optical component mount according to claim 1, wherein the movable portion comprises an optical component support portion.

9. The optical component mount according to claim 1, wherein the another articulation allows another rotational motion of the another movable portion about another axis of rotation or another translational motion of the another movable portion relative to the movable portion along another axis of translation.

10. The optical component mount according to claim 1, wherein said another movable portion comprises another optical component support portion.

11. The optical component mount according to claim 1, wherein the fixed portion and the movable portion comprise a metal material.

12. The optical component mount according to claim 1, wherein the fluid flowing inside the cooling circuit comprises water, propylene glycol and/or a gas.

* * * * *